(No Model.)
I. G. BOWER.
THILL COUPLING.
No. 271,191. Patented Jan. 23, 1883.
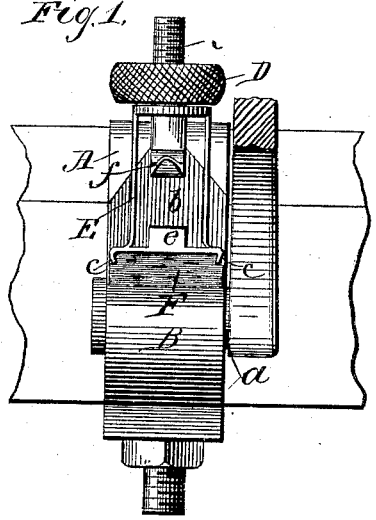
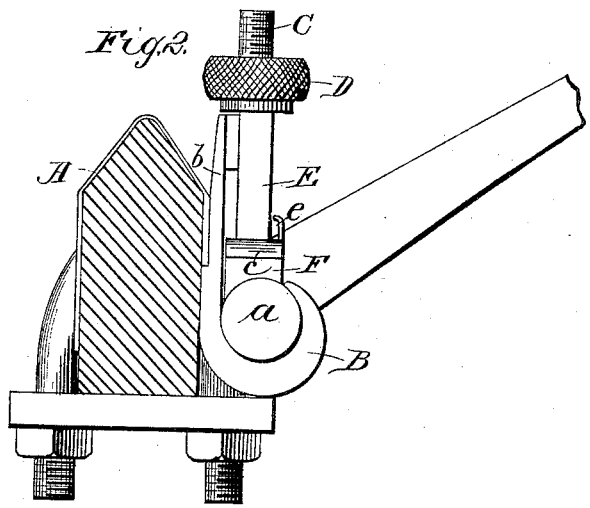
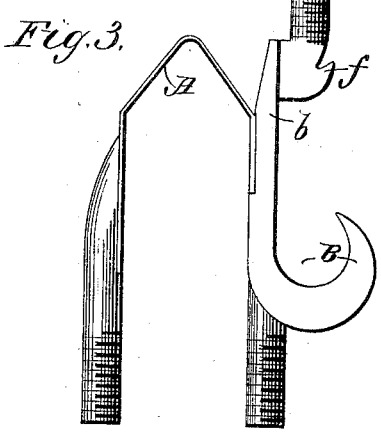
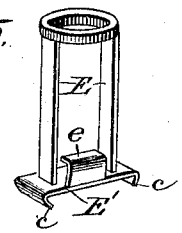
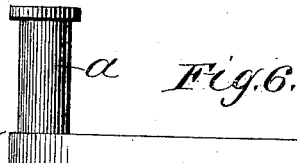
Witnesses
Jas. H. Baxter
C. Lynch
Inventor
Isaac G. Bower
By Myers & Co
Atty.
N. PETERS, Photo-Lithographer, Washington, D. C.

UNITED STATES PATENT OFFICE.

ISAAC G. BOWER, OF FREMONT, OHIO, ASSIGNOR TO L. B. MYERS, OF SAME PLACE.

THILL-COUPLING.

SPECIFICATION forming part of Letters Patent No. 271,191, dated January 23, 1883.

Application filed July 11, 1882. (No model.)

*To all whom it may concern:*

Be it known that I, ISAAC G. BOWER, a citizen of the United States of America, residing at Fremont, in the county of Sandusky and State of Ohio, have invented certain new and useful Improvements in Thill-Couplings, of which the following is a specification, reference being had therein to the accompanying drawings.

This invention relates to an improvement in thill-couplings, having for its object to enable the ready and easy attachment and detachment of the thills or shafts and the convenient holding of the rubber or elastic packing while the thills are being connected to or removed from the axle; and the nature of the invention consists of an eye or hooked bracket, preferably fastened to the axle-clip, and having a screw upon which works a nut adapted to tighten and permit loosening of the packing holder or support. This support or holder has a hook or angular lug, which is capable of engagement with a hook or notch on the lower portion or end of the screw, substantially as hereinafter more fully set forth.

In the accompanying drawings, Figure 1 is a front view of my improved thill-coupling. Fig. 2 is a side view thereof; and Figs. 3, 4, 5, and 6 are detail views.

A is the axle-clip, connected in the usual way to the axle.

B is the hooked bracket or open eye to receive the thill arm or axis *a*, said bracket being fixed, cast upon, or bolted, to the front side of the axle-clip A. The thill arm or axis *a* has a flange or head at its outer end to prevent lateral displacement of the same.

To the upper end of the plate *b* of the eye or bracket B is affixed a screw, C, so as to stand in a relatively-parallel plane therewith. The screw C has a bail or frame inserted upon it, and above the bail or frame is placed or works a nut, D. The bail or frame E is fixed at its lower end to a head, E', which has inwardly-projecting hooks or lugs *c*, to take into notches or recesses in the thill packing or cushion F. This cushion or packing, which holds the thill-arm in the eye of the bracket connected to the axle-clip against rattling or becoming displaced or detached, is made of rubber or elastic material, and rounded out on its under side to conform to the shape of the said axle-arm. The frame, bail, or support E of the cushion or packing has an angular lug or hook, *e*, on its upper side, which, when the nut is loosened and sufficiently elevated upon its screw to permit the required elevation of the bail with the packing to permit the withdrawal of the axle, is hooked into the notch or hook *f* on the lower end of the screw. This permits the holding of the packing out of the way of the attachment and detachment of the thills.

I claim and desire to secure by Letters Patent—

1. The combination, with the thill-arm and axle-clip, having the open eye or bracket and provided with a fixed screw, of the pack-holder with its packing and the nut, substantially as and for the purpose specified.

2. The combination, with the axle-clip having the open eye or bracket provided with a fixed screw, of the nut, thill-arm, packing, and bail or frame, having an angular lug or hook on its upper side capable of engagement with a hook or notch of the screw, substantially as and for the purpose specified.

In testimony whereof I affix my signature in presence of two witnesses.

ISAAC G. BOWER.

Witnesses:
JAMES H. FOWLER,
LEWIS B. MYERS.